US008621796B2

(12) United States Patent
Egritepe et al.

(10) Patent No.: US 8,621,796 B2
(45) Date of Patent: Jan. 7, 2014

(54) CONDUIT DUCT WITH SEQUENCE OF LAYERS

(75) Inventors: Senol Egritepe, Heidenheim (DE); Martin Heck, Zöschingen (DE); Michael Seibold, Blaustein (DE)

(73) Assignee: Hauff-Technik GmbH & Co. KG, Herbrechtingen (DE)

( * ) Notice: Subject to any disclaimer, the term of this patent is extended or adjusted under 35 U.S.C. 154(b) by 248 days.

(21) Appl. No.: 12/996,588

(22) PCT Filed: Mar. 11, 2009

(86) PCT No.: PCT/EP2009/001748
§ 371 (c)(1),
(2), (4) Date: Mar. 11, 2011

(87) PCT Pub. No.: WO2009/146761
PCT Pub. Date: Dec. 10, 2009

(65) Prior Publication Data
US 2011/0156354 A1   Jun. 30, 2011

(51) Int. Cl.
*E04C 2/52* (2006.01)
(52) U.S. Cl.
USPC .............................. 52/220.8; 52/232; 277/632
(58) Field of Classification Search
USPC .............. 52/220.1, 220.8, 232; 277/606, 632; 174/77 R
See application file for complete search history.

(56) References Cited

U.S. PATENT DOCUMENTS

| | | | | |
|---|---|---|---|---|
| 1,851,940 | A * | 3/1932 | Williams | 138/89 |
| 2,117,152 | A | 5/1938 | Crosti | |
| 3,466,693 | A * | 9/1969 | Grant | 15/220.4 |
| 3,775,204 | A * | 11/1973 | Thompson et al. | 156/53 |
| 8,122,655 | B2 * | 2/2012 | Kreutz | 52/220.8 |

FOREIGN PATENT DOCUMENTS

| | | |
|---|---|---|
| DE | 1 218 237 | 6/1966 |
| DE | 38 28 693 C1 | 10/1989 |
| DE | 39 17 447 C1 | 4/1990 |
| DE | 201 04 279 U1 | 7/2001 |
| DE | 103 13 306 B3 | 1/2004 |
| DE | 103 47 653 A1 | 5/2004 |
| DE | 20 2004 011 202 U1 | 12/2005 |

(Continued)

OTHER PUBLICATIONS

Written Opinion in the corresponding PCT Application No. PCT/EP2009/001748 of which the instant application is the US National Phase.

(Continued)

*Primary Examiner* — Jeanette E Chapman
*Assistant Examiner* — Daniel Kenny
(74) *Attorney, Agent, or Firm* — Wood, Phillips, Katz, Clark & Mortimer

(57) ABSTRACT

A conduit duct for sealing at least one conduit includes an elastomer body for sealingly contacting the conduit. The elastomer body comprises at least two elastomer parts, wherein each of the elastomer parts includes a plurality of hollow sleeves. In an assembled condition of the elastomer body parts, the hollow sleeves of one of the body parts are arranged with the hollow sleeves of the other one of the body parts to form a sequence of layers surrounding the conduit. A tensioning device positioned on the elastomer body compresses the elastomer body to thereby sealingly press the body onto the conduit.

12 Claims, 12 Drawing Sheets

(56) References Cited

FOREIGN PATENT DOCUMENTS

| | | |
|---|---|---|
| EP | 0 177 518 | 10/1985 |
| EP | 1 843 071 A1 | 10/2007 |
| FR | 2 549 651 | 1/1985 |
| FR | 2 590 347 | 5/1987 |
| GB | 1021457 | 3/1966 |
| WO | WO 2005/057749 A1 | 6/2005 |

OTHER PUBLICATIONS

International Search Report for the corresponding PCT Application No. PCT/EP2009/001748 dated Jul. 28, 2009.

* cited by examiner

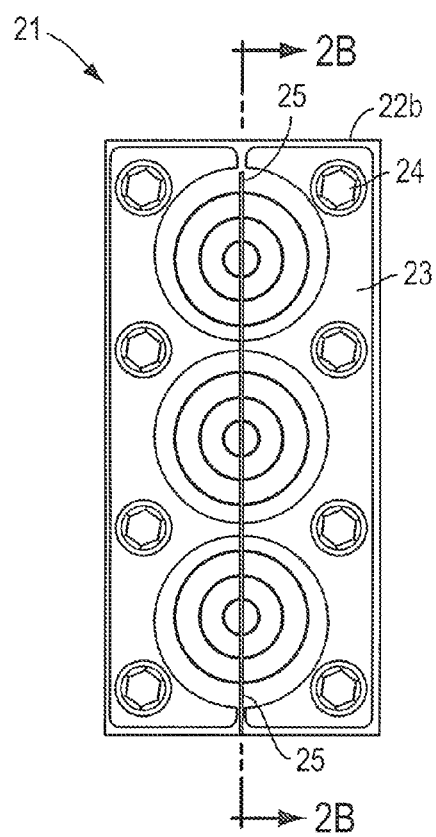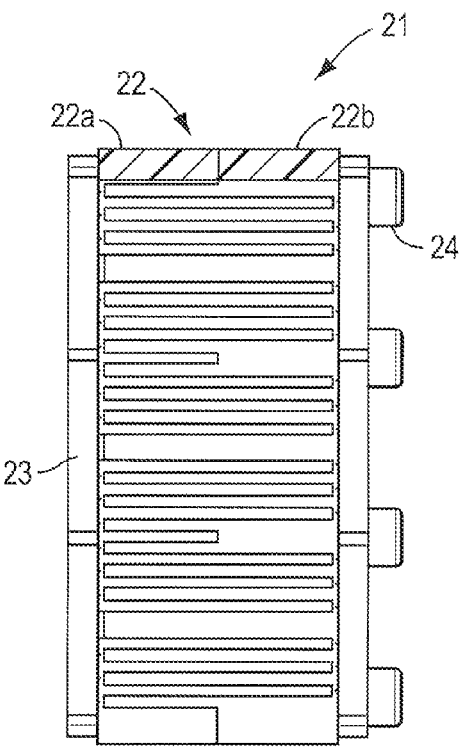
FIG. 2A
FIG. 2B
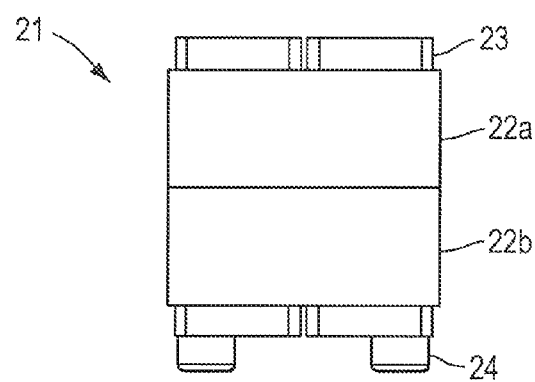
FIG. 2C

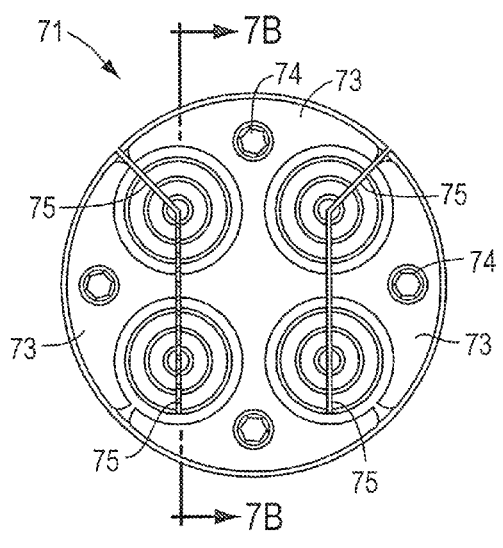
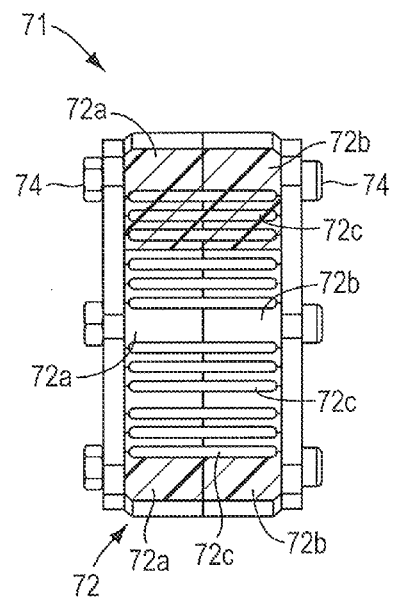
FIG. 7A          FIG. 7B
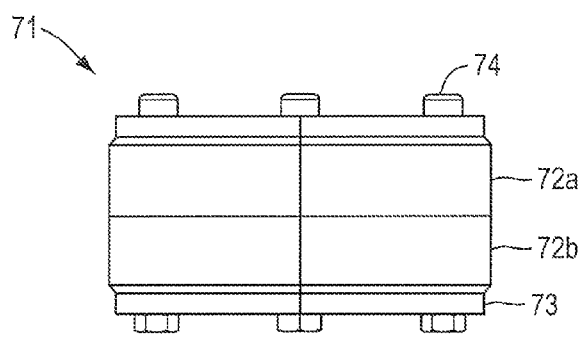
FIG. 7C

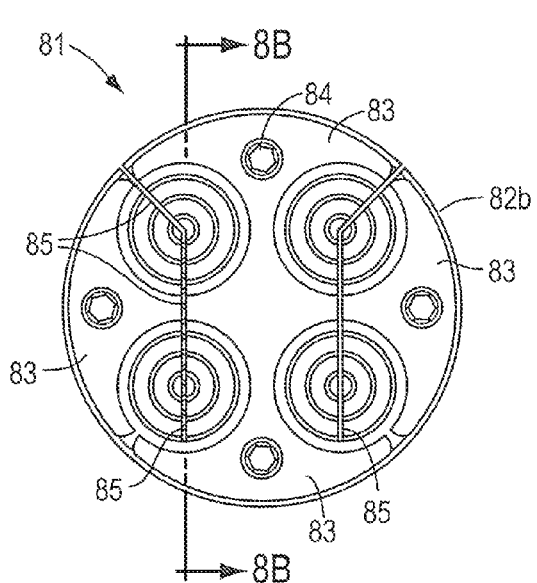
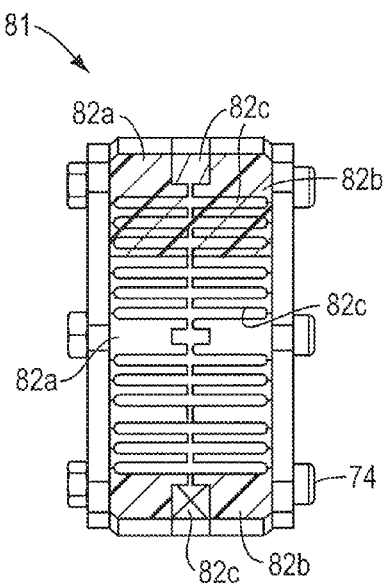
FIG. 8A    FIG. 8B
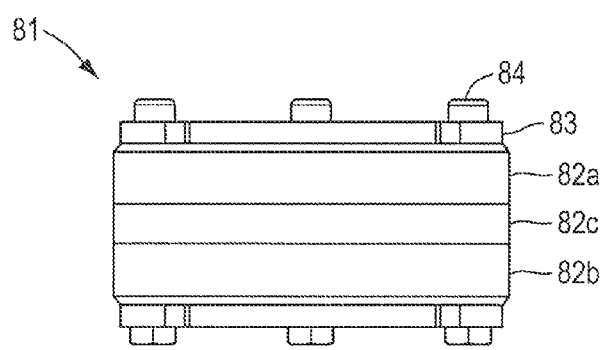
FIG. 8C

CONDUIT DUCT WITH SEQUENCE OF LAYERS

FIELD OF INVENTION

The invention relates to an apparatus for leading a conduit sealingly through a wall opening, which is referred to as conduit duct below for the sake of simplicity.

BACKGROUND OF THE INVENTION

Conduit ducts are extensively used, particularly in walls of buildings. Furthermore, conduit ducts are also known for leading conduit ducts sealingly through other walls than walls of buildings, for instance in ships and so on. In terms of the invention, a wall therefore is a sealed boundary of a region. Therein, inner or outer walls, for instance of aircrafts, watercrafts, space-crafts or landcrafts, of machines or technical plants, are preferred, wherein the sealing can relate to liquids and/or gases. However, the walls can also be walls of housings of technical devices, for instance made of metal or polymer materials. Preferably, the conduit is an electric current, gas, water, heat, telecommunications or another signal or data conduit. The conduit can be rigid or flexible.

Conduit ducts often comprise elastomer bodies, which can be subjected to a pressing and brought into a sealed contact to the conduit by a tensioning device. Therein, coverings are occasionally applied for the conduits, so that the elastomer body seals for instance a pipe portion, through which then a line is led through, which can be additionally sealed, if applicable. Thus, the term "conduit" also relates to coverings provided for the length of the duct solely, in which a further conduit is arranged.

Usually, a sealed contact to an inner surface of the wall opening or to an inserted frame, to a soffit in any case, can be made by the pressing of the elastomer body. However, this is not mandatory in the context of the following invention. In fact, the conduit duct can for instance also be screwed in sealingly or be otherwise mounted sealingly, without the sealing between the conduit duct and the soffit depending on the pressing of the elastomer body.

In practice, not only different types of conduits have to be sealed, but also different conduit cross sections above all. Even though those are normally circular, which is also not mandatory for the invention, still the cross sections vary. In some cases, elastomer bodies being individually adapted are supplied and applied accordingly, because the pressing and the elastic deformation of the elastomer body can not bridge distances of any size.

Furthermore, constructing an elastomer body with a sequence of layers, each of which encloses the conduit, is known, for instance from EP 1 843 071 A1. In the prior art, those layers are sometimes also referred to as "onion skins" or "onion rings". Sometimes, they are connected to each other at one side by relatively thin bridges, sometimes they are loose. Anyway, they are provided for radially adapting an opening in the elastomer body to a specific conduit cross section by removing a specific number of layers, beginning from the inside.

BRIEF SUMMARY OF THE INVENTION

The present invention is directed to the technical problem of providing an improved conduit duct having a sequence of layers for an adaption to conduit dimensions.

The solution of this problem is a conduit duct for setting up a sealing of an opening in a wall penetrated by a conduit, of at least two parts being integral respectively, and a tensioning device for tensioning the elastomer body and thereby pressing the elastomer body sealingly onto the conduit, wherein the elastomer body parts are adapted for forming a sequence of a multitude of layers in an assembled state, which layers enclose the conduit respectively, characterized in that a plurality of the layers belongs to one single elastomer body part and adjacent layers belong to different elastomer body parts.

Preferred embodiments are provided in the dependent claims, wherein some of these embodiments also refer to sets or systems with a plurality of those conduit ducts. The invention is also directed to particular uses. As a matter of precaution only, it should be noted that in the following description of the invention and the preferred features are also relevant for other claim categories, in particular for methods of manufacturing the conduit duct and for methods of sealing conduits in wall openings.

For the explanation of the invention, the term "elastomer body part" is used. Therewith, integral elastomer parts, each being interconnected in itself, are meant.

Thus, the term shall not be understood as a plurality of separate parts. According to the invention, adjacent layers of the sequence of layers belong to different elastomer body parts. As far as elastomer body parts with a plurality of layers, namely connected onion skins, were known in the prior art, those were adjacent directly and only separated by thin cylindrical slits. In contrast thereto, in the invention, one or also a plurality of layers of different elastomer body parts shall be located between layers belonging to one single elastomer body part. Therein, in contrast to conventional solutions with entirely loose onion skins, a plurality of layers belong to one elastomer body part, wherein additional layers can nevertheless be separately available, which is discussed below.

Thereby, adjacencies with a different distance to the conduit are meant by the term "adjacent", namely radial adjacencies for the common cylindrical geometries. In the prior art, slit sequences of onion skins are already known, which can be disassembled or folded open for inserting conduits. Then, those slits do not run around the conduit, but towards it or away from it, namely in particular radially for cylinder geometries. They are also possible with this invention and are even preferred. Parts of an onion skin or layer separated by those slits, but being the same layer apart from that, shall not be meant by "adjacent", the term thus relates to radial adjacencies and not to adjacencies existing in a circumferential direction.

From the allocation of adjacent layers to different elastomer body parts, as discussed, it appears that interspaces are present between the layers of an elastomer body part with a plurality of layers, which correspond to the thickness of further layers at minimum. Therewith, it is particularly easy to manufacture the elastomer body part, for instance by injection molding. Cutting thin slits between the onion skins using a thin tool can be avoided, namely in particular operations relating to closed round cutting lines and to a plurality of slits in a sequence with respect to the distance to the conduit. The cutting processes are comparably sophisticated and can, according to the invention, be replaced by designing an injection mold accordingly or by another skillful adaption of the synthetic material manufacturing process.

In a cross sectional view, the layers are virtually formed as the teeth of a comb due to the interspaces between the layers of the same elastomer body, wherein other layers are inserted into the interspaces between the teeth, when the elastomer body and the conduit duct are assembled and inserted. Therein, the other layers can also belong in a plurality to one single elastomer body part, so that, to use again the picture of the comb, combs interlock in a way. Additional loose layers can also be applied, which can also be manufactured without cutting slits, again, for instance by injection molding or other established methods for three-dimensional elastomer bodies.

As a result of the described interspaces between the layers of the same elastomer body, the connecting webs between those layers are thicker than in case of the layers separated only by thin cut slits according to the prior art. In case of a sufficiently thin (in conduit direction) design, they can also be used as hinges or flectors. Therewith, the layers can be folded around those connecting webs, which will be further explained below. For conventional sequences of onion skins being only separated by cut slits, the radial thickness is not sufficient for that. To obtain a sufficient flexibility, the webs would have to be so thin (in conduit direction) that they are torn off easily.

Designing the connecting webs thicker has furthermore the advantage that the thickness or ring width available per layer at the face of the elastomer body opposite to the layers, which is the addition of the web thickness and the layer thickness, is significantly larger than in the prior art, for equidistant layers for example approximately twice as large. Therewith, this face is suited much better for labels or other markings, by which the fitter can directly determine even without trying which layers have to be folded out or to be removed and which not.

With respect to the direction defining the distance to the conduit, namely radially for cylindrical geometries, there are preferably at least two elastomer parts, each with a plurality of associated layers, for certain embodiments there are exactly two, but also three for different embodiments, for which reference is made to the examples. More than three elastomer body parts with a plurality of layers are also conceivable. Therewith, separations by slits in direction to the conduit or away from the conduit (for folding the sequence of layers open or disassembling it) are not meant. An embodiment having for instance exactly two elastomer body parts connected in a sectional plane containing the conduit can actually contain four (in case of one radial slit going through) or more (in case of more than one slit) separate integral elastomer body parts due to those slits. Thus, preferring the number of two or three integral elastomer body parts relates to a picture in a sectional plane containing the conduit, wherein those slits in a radial or, more in general, a direction towards the conduit and away from it are neglected.

It is further preferred that all layers used in the sequence of layers belong as a plurality respectively to one elastomer body part, namely that no separate onion skins occur. Although the separate onion rings can be manufactured easily, they enlarge the number of individual parts and thus finally still increase the complexity of the manufacturing, but also in particular the complexity during assembling and adapting the conduit duct according to the invention to a specific conduit format.

It has already been mentioned that the individual layers enclose the conduit, namely form a lateral surface (having a certain thickness) of an imaginary body, which contains the duct. (Here again, the slits directed from outside to the conduit and away from it to the outside are neglected.) This imaginary body does not necessarily have to be symmetric or centered with respect to the conduit. However, this is preferred. Further, the layers of the elastomer body parts, which comprise a plurality of layers, are, for at least two elastomer body parts, preferably connected to each other at an end, referring to the conduit direction, and not centrically. To stay with the picture of the comb: The teeth protrude to one side away from the basis of the comb and not to opposing sides.

Therein, the layers of an elastomer body part namely form hollow bodies connected to each other at one end respectively. A centrical layer, which can also be provided for sealing the wall opening even without a conduit, is an exception in this respect, as it is certainly not hollow.

Further, in a preferred embodiment, a third elastomer body part could be an exception to that effect, because the connection between the layers is not provided at an end there, but at a position between the ends, namely that the comb comprises teeth to opposing sides in a sense. Then, the elastomer body part can be placed between two elastomer body parts as described above for forming the elastomer body by three elastomer body parts in total (or in case of additional elastomer body parts being constructed analogously to the third one, by even more than three). For illustration, reference is made to the examples.

In particular, such a third elastomer body part can contain functional additives, which cause certain additional technical properties (in addition to the elastic properties), for instance a conductivity for EMI-shielding, an X-ray absorption or fire protection properties.

In the context of the rotational symmetry mentioned, symmetrical geometries shall certainly be considered first (wherein the slits directed to the conduit and away from it are neglected again, of course), which are already known and common in the prior art. Therein, the onion skins are equidistant in the prior art, which is not mandatory in the context of this invention. It can be convenient to use onion layers of a different thickness, for instance of thicknesses increasing with the distance to the conduit, in particular increasing proportionally (and thus ensuring a constant relative adaptability). The layer thicknesses can also be adapted to existing standardized cross sections or other distributions of conduit cross sections practically established and can be distributed accordingly, closer in certain regions and coarser in others.

However, the invention also is directed to a particular non-cylindrical embodiment with at least partially conical lateral surfaces of the layers, wherein the "slope" is preferably relatively small, namely half the cone angle defining the "slope" of the conical lateral surfaces is 10° at maximum, preferably 5° at maximum. With those conical interfaces between the layers, interspaces between the layers can be generated by pulling elastomer body parts slightly apart in conduit direction. Within the material elasticity, these interspaces then lead to an extended yielding during tensioning and can thus be used for a fine adaption to certain conduit dimensions or also to soffit dimensions, particularly when the staggering specified by the sequence of layers should be to coarse for this adaption and intermediate values are desired.

At this occasion, it has to be mentioned that the invention relates in particular to the adaption to conduit dimensions by individually removing layers beginning from inside, as known from the prior art. However, it is also directed to the complementary case that for the adaption to a certain soffit dimension, into which the elastomer body shall fit, the layers are removed beginning from outside. Naturally, both cases can also be combined.

To a relatively great extent, use should be made of the elastomer body length in conduit direction by the length of the comb teeth or the layers, so that the connecting webs between the layers remain relatively small, particularly preferred amount to 10% at maximum, preferably 7% or 5% of the total elastomer body length. Thus, the layers can easily be removed, either by tearing off or also by cutting off. A removal by simply folding out is also included, which is insofar particularly preferred as in case of an accidental misadaption, layers can then also be put back without having become loose meanwhile. Therein, the connections between the layers would be used as a hinge in a sense, and the layers not needed would be folded out to a region, in which they do not interfere with the sealing function.

Further, it has proven to be useful to let the elastomer body parts contact each other in a centred manner, namely approximately between 20 and 80% referring to the total elastomer body length, in the outer region, namely in the outermost layer or in a region, which cannot be considered anymore as "detachable" or "foldable". Therewith, a certain length in conduit direction remains for each elastomer body part in the outer region, in which the layer thicknesses normally are a little thicker. This section of the elastomer body part has a stabilizing effect and simplifies handling. If this outer interface would be arranged outside the mentioned region between 20 and 80% of the total elastomer body length, only a little material length would remain for one of the two elastomer body parts, which would consist of onion skins to a great extent and could be unstable during handling. Preferred lower limits are 30% and 40%, preferred upper limits are 70% and 60%.

Above, it has been mentioned that the layers shall enclose the conduit. This does not exclude that the layers can be opened and are slit for this purpose. Rather, a slit embodiment is preferred. Accordingly, a slit penetrating through the layers into a central region and therewith going through is preferred. The conduit can then be inserted by folding-open and does not have to be inserted through an opening in the elastomer body. Thereby, in particular, conduits can also be sealed, which are already led through the wall opening or which complicate or prevent an insertion in another way.

In a further preferred embodiment, the elastomer body has a thickening of its cross section perpendicular to the conduit direction in the outer lateral region, wherein this thickening lies between 20 and 80% of the total length of the elastomer body in conduit direction. On the one hand, this thickening can cause a more pronounced force in the directions perpendicular to the conduit direction with the benefit of improved sealing properties, so to say as an integrated wedge. This can be particularly desirable, if at least in a section along the conduit length within the conduit duct respective contact pressures are needed, but the cross section of the elastomer body shall not be enlarged as a whole to avoid an excessive deterioration of its handling properties during insertion. In addition to that, the thickening mentioned can act as a certain protection against pulling the elastomer body unintentionally out in conduit direction, particularly if a corresponding hollow form for receiving the thickening is provided. This hollow form can also be provided in an elastomer frame, namely in an additional elastomer part of the conduit duct, which surrounds the elastomer body, but also in the wall opening itself.

The preferred manufacturing by injection molding has already been mentioned. Basically, the invention is suited for different manufacturing methods being simplified compared to cutting slits between layers conventionally, particularly for those, in which a mold is used and filled with the elastomer material. Besides the injection-molding, the pressing and transfer-pressing are particularly preferred. Therein, plastically deformable material is pressed with a mold and, in case of the transfer pressing, fed by an extruder. Further, casting (without pressure), foaming into a mold, extruding into a mold or blowing into a mold are of interest.

In the context of simplifying the manufacturing, also another preferred embodiment is of interest, wherein a certain standardization of the elastomer body parts is provided for different conduit ducts.

Therein, different conduit ducts shall each comprise identical elastomer bodies. The conduit ducts can be different with respect to the number of conduits receivable and/or with respect to its dimensions. The comprised elastomer bodies do not necessarily have to be identical completely, for instance elastomer bodies of a different size can be comprised in a conduit duct for a plurality of conduits. However, identities shall exist with respect to the elastomer body parts in different conduit ducts, for instance by using the same elastomer body for comparable sizes of conduits. Therein, the set of elastomer body parts is meant by "elastomer body", which forms a self-contained system with respect to the sequence of the layers. Of course, these elastomer bodies can be surrounded by other components of elastomer material further outwards (further outwards radially in case of cylinder geometries), which are also involved in the tensioning, for instance they can be held together thereby. The idea of identity or partial identity between elastomer bodies is not related to these.

One aspect of the invention relates to larger openings, which can receive quite a number of ducts. Conventionally, in a frame inside the wall opening, two respective half-shelves made of an elastomer are laid around a respective conduit, together enclosing the conduit completely. Beginning at one side, the wall opening is partially filled up by further elastomer bodies, which enclose further conduits pairwise where applicable. A tensioning device is inserted into the remaining section, possibly together with further filling pieces for filling the wall opening completely, in order to mechanically fasten and seal the elastomer bodies and conduits in the wall opening by pressing the elastomer bodies, which have been loosely laid on top of one another until then, perpendicularly to the duct direction. Therein, the frame mentioned is not mandatory for the invention.

In this embodiment, the conduit ducts being available in a plurality are modules, respective ones of which not only have such a cross sectional area that they can be inserted into the opening for sealing together and comprise an elastomer body according to the invention for receiving the conduit, but also each have a tensioning device for tensioning in conduit direction and an elastomer sealing surface, which lies outside on the circumference of the module perpendicular to the conduit direction, when the tensioning device is tensioned.

The idea behind the invention is based on the findings of the inventors that the squeezing effect inside the stacked elastomer bodies in a conduit duct according to the prior art decreases with increasing distance from the tensioning device, involving the risk that the sealing function of remote elastomer bodies could become insufficient. On the other hand, a stronger squeezing leads to a higher mechanical stress on the elastomer bodies located close to the tensioning device and on the conduits embedded therein, involving the risk of damaging these.

Further, it turned out to be a disadvantage during the installation of such a system according to the prior art that, first, all the conduits inside the wall opening have to be enclosed by the elastomer bodies and the elastomer bodies have to be positioned next to each other therein in such a way that they completely fill the wall opening together with the tensioning device and are not fastened inside the wall opening until a final step of the installation, namely until the tensioning of the tensioning device. As a result, they can easily move away from their intended position during the installation and, in particular in the case of vertical conduit ducts, fall out of the wall opening.

By a "decentralized" squeezing of the elastomer bodies enclosing the conduits, a better adjustability and a pressure distribution as homogenous as possible for a uniform sealing function is accomplished, as well as, if needed, a sectionwise and thus stepwise mounting inside the wall opening for facilitating the installation.

Therein, the conduit duct system according to the invention is also intended for an opening in a wall having a frame, which is preferably partially or entirely embedded in the wall opening, but which can also be positioned in front of the opening on the wall.

Thus, an installation of the conduit duct system in a here so-called "through-hole" of the frame of the "wall opening" is (also) intended. In the following, the term "through-hole" thus denotes the opening for receiving the conduit duct system of the frame which is, on its part, installed in a "wall opening".

Therein, a continuous opening is contemplated, and thus no aggregate of a plurality of openings separated from each other. Such separated openings appear in the prior art, in particular, in cases where frames are partitioned by solid grid partitionings in such a way that they comprise a plurality of (in each case continuous) through-holes, into each of which a conduit duct is then inserted in the prior art. Thus, the invention preferably relates to applications, in which the modules are actually inserted contacting each other, being at least not separated from each other by frame grid walls or other rigid parts.

The invention intends that the through-hole is being closed by a plurality of modules by arranging the modules in a plane perpendicular to the duct direction inside the opening. To this end, the modules need to fit into the opening, i.e. the cross-sectional area of the modules arranged for closing has to constitute a partial area of the cross-sectional area of the through-hole, so that these modules can be inserted into the through-hole together for sealing. Hereto, the modules preferably have a contour shape suited for an arrangement filling an area, for instance, the shape of a rectangle or a regular hexagon.

Inside the through-hole, the modules seal by the elastomer body sealing surface being arranged, at least when the tensioning device is tensioned, outside, with respect to a direction perpendicular to the duct direction, on the circumference of the modules.

The modules are fastened inside the through-hole by their tensioning devices, wherein the elastomer bodies are squeezed in the duct direction and expand in directions perpendicular thereto, so that the elastomer body sealing surfaces being arranged outside are pushed outwards. By this expansion, the modules can be tensioned and thus fastened against the inner surface of the through-hole and are, at the same time, sealing against each other as well as against a conduit received in an elastomer body.

The expansion of the modules perpendicularly to the duct direction as the tensioning device is tensioned makes it possible to mount a single row of modules inside the through-hole, as soon as the row reaches from one wall to an opposite wall of the opening. In particular, the invention thus allows to mount one part of the modules already before the entirety of the modules needed for the conduit duct are inserted into the through-hole.

Further, it is conceivable, though not preferred, that the modules according to the invention are inserted together with further modules not having a tensioning device, wherein, in this case, at least one module according to the invention should be present in each row for mounting the same in the through-hole. In terms of the invention, gaps which cannot be bridged by the expansion of the modules upon squeezing can be occupied by filling pieces, preferentially made of elastomers.

As already described above, the elastomer body is squeezed by the tensioning device in the duct direction for sealing by an expansion in directions perpendicular thereto and for fastening the modules in the through-hole. By preference, the tensioning device for this purpose comprises supporting surfaces on the face sides of the elastomer body to both sides in the duct direction, which transfer the tensioning force applied in the duct direction. Preferably, those supporting surfaces completely border the face sides for transferring the force uniformly. This also applies—like all embodiments described below—independent of the above modular assembly, though particularly to it.

In a preferred embodiment, the tensioning device is, when closed, fastened to the elastomer body by enclosing it and, in doing so, can hold it together when it is slit or multi-part. To this end, the tensioning device embraces the elastomer body on its circumference perpendicularly to the duct direction virtually like a belt, not fully covering this circumference surface though, to allow the expansion of the elastomer body perpendicularly to the duct direction.

For enclosing, the tensioning device can comprise a first leg on the circumference surface and, for squeezing, a second leg on each face side of the elastomer body. Thereby, the elastomer body and the tensioning device exhibit a profile which, due to a form closure of the two, prevents a pulling of the elastomer body out of the module in the duct direction upon, for instance, a pulling force exerted on the conduit, when the tensioning device is closed.

The tensioning device preferably comprises a closure for inserting or taking out the conduit, so that the tensioning device can be dismounted from the module, for instance in order to check, to repair, or to replace the device, without a necessity of removing the elastomer body from the conduit or even taking the conduit out of the wall opening to do so, and so that further, in case of slit or, as a consequence of a multi-part structure, removable elastomer bodies, the module is, in addition, useable for sealing of a conduit which is already installed in the through-hole.

A preferred embodiment of the closure comprises a tensioning bolt, by preference a screw, enabling the tensioning device to be opened and to be closed again for tensioning. When opening the tensioning device, by preference a further tensioning bolt for tensioning in the duct direction, preferably a screw, is used as articulated axle for opening the tensioning device perpendicularly to the duct direction for inserting or taking out a conduit. For transferring the tensioning forces, metal or glass fiber reinforced plastic is, by preference, used as a material for the tensioning device.

By preference, the conduit duct comprises a color marking visible in the duct direction. It is therein conceivable for the color marking to represent, for instance, information on the diameter or the type of the conduit which the module is suited to receive.

For distributing the pressing force of the tensioning device, the modules preferably comprise on both sides of the elastomer body or, respectively, of the elastomer body parts squeezing plates made of a solid material, for example of a metal or a glass fiber reinforced plastic. This ensures that the contact pressure of the tensioning device needed for sealing is transferred to a larger part of the face surface of the elastomer body. In a possible embodiment, a squeezing plate is firmly attached to the elastomer body on each of the two sides in the duct direction. When using the squeezing plates, the tensioning device applies a force in the duct direction directly on those plates, wherein the plates, with the elastomer bodies attached, as the case may be, can be held in the module by a form closure with the tensioning device.

Further, the elastomer body or, respectively, the elastomer body parts for receiving one or a plurality of conduits are preferably removable from the module and exchangeable against others as the tensioning device is opened, so that a module is adaptable with respect to the number as well as with respect to the type and the diameter of the conduits to be received.

In an advantageous configuration, a conduit duct system according to the present invention is, in particular, distinguished by a feature that the module according to the invention can receive a conduit outside the through-hole and is pre-fixed at the conduit by closing the closure of the tensioning device. In particular in the case of ducts with a plurality of conduits, it is an advantage that the sealing elastomer bodies can thus be individually pre-fixed relatively to the conduits. In addition to the decentralized tensioning of the modules inside the through-hole, described above, the invention thus provides further advantages with respect to the prior art, for instance, the elastomer bodies are prevented from falling out of the through-hole while being mounted, a uniform pressure distribution on the sealing surfaces can be achieved in the sealing, and individual modules can even be released from an assembled conduit duct system, for example for receiving an additional conduit or exchanging an existing conduit, without opening further conduit sealings or even without a necessity of dismounting or a new mounting of a bigger part of the conduit duct inside the through-hole.

In the following, the invention is explained more in detail by means of embodiments, wherein the features disclosed therein can be significant for the invention also in other combinations and implicitly relate, as mentioned above, to all categories of the invention.

BRIEF DESCRIPTION OF THE DRAWINGS

Therein, there show

FIG. 2A is a front view of a further embodiment of the present invention;

FIG. 2B is a diagrammatic, cross-sectional view taken along line 2B-2B of FIG. 2A;

FIG. 2C is a top view thereof;

FIG. 7A is a front view of a further embodiment of the present invention;

FIG. 7B is a diagrammatic, cross-sectional view taken along line 7B-7B of FIG. 7A;

FIG. 7C is a top view thereof;

FIG. 8A is a front view of a further embodiment of the present invention;

FIG. 8B is a diagrammatic, cross-sectional view taken along line 8B-8B of FIG. 8A;

FIG. 8C is a top view thereof;

DETAILED DESCRIPTION OF THE INVENTION

Figure 1A:
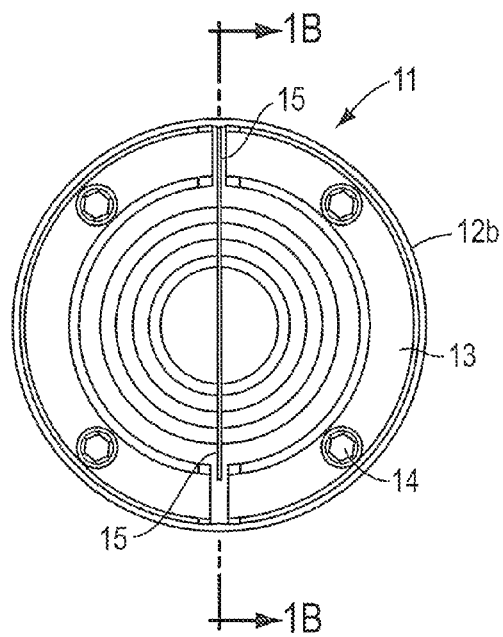
FIG. 1A is a diagrammatic front view, in a conduit direction, of a conduit duct embodying the principles of the present invention.

FIG. 1A shows an embodiment according to the invention, which is provided for one single conduit to be arranged centrally. The conduit duct 11 comprises an elastomer body 12 with two elastomer body parts 12a and 12b and a tensioning device made of four semi-circular U-profile metal sheets or squeezing plates 13 and four tensioning bolts in the form of screws 14.

The basic geometry is obviously cylindrical, wherein the central axis of the conduit not drawn is the cylinder axis. In this respect and with respect to the design of the tensioning device 13, 14, the embodiment corresponds to the prior art, only the design of the elastomer body 12 differs therefrom. In contrast to the prior art, both elastomer body parts 12a, b namely comprise hollow cylinders being interlaced with each other or interlocked and following on each other, which can be seen in the section A-A of FIG. 1B. In this section, they appear as comb teeth, wherein the layers of the left elastomer body part 12a are connected on the left by webs running radially, and those of the right elastomer body part 12b are connected on the right. For the sake of clarity, the layers are not individually labeled with reference numerals, but can be seen in the section. It should be noted that, in the front view in the upper left (and in the following figures), the circles do not indicate the boundaries between these layers, but notches of the connecting webs, in the outside of the elastomer body part 12b in this case. The notches are marked as small horizontal lines in the sectioning in the upper right and form thin portions of the walls, but no interruptions.

Both elastomer body parts form, seen axially, half of the elastomer body in the radially outer region; in the radially innermost region, a cylindrical block is provided, which forms the centrical part of the first elastomer body part 12a. At least this block has to be removed for inserting a conduit and serves for sealing a wall opening also without a conduit. It has to be removed by tearing it off or cutting it off.

In contrast thereto, the layers following on this block radially outwards can not only be torn off or cut off, rather, it is possible and sufficient to fold them outwards due to the radial length of the connecting webs. Then, they are arranged, with respect to the sectional view FIG. 1B, on the left or on the right of the region occupied by the elastomer body 12 in the figure. In the manner known per se, a dimensional adaption to the conduit to be led through can be made. In case of a mistake thereby, however, the layers can also be folded back. There is no risk of losing the layers or of leaking layers, when being inserted again, because of having lain in the dirt, or risk of being reinserted geometrically imprecise. Rather, the folding mechanism defined by the connecting webs and the thin portions provides for a perfectly fitting repositioning.

If the conduit shall actually be inserted, a slit 15 through the elastomer body parts 12a, b, being visible as the hatching in the lower region (approximately in the lower sixth) of the section (FIG. 1B), can be used. This slit 15 is also visible as a solid line drawn vertically in the front view in the upper left. The lower dashed region, which corresponds to the hatching on the right in the section, is not slit. It serves to allow bending the elastomer body parts 12a, b open. For the same purpose, the U-profile squeezing plates 13 are divided into semicircles.

The elastomer body parts 12a, b can be produced as two elastomer injection molding parts, because the distances between the layers belonging to a common elastomer body part are sufficiently large. Sophisticated cutting processes are omitted to a large extend, namely besides the slit 15, which is less problematic in this respect due to the straight shape. Then, the elastomer body parts 12a, b can be put together and be provided with the tensioning device 13, 14. Thereto, the U-profile squeezing plates 13 have just to be laid on, and the tensioning screws 14 to be shoved through and to be screwed into a corresponding thread of the pressing plate 13 on the opposite side.

On the construction site, a craftsman can then open the conduit duct, adapt it, according to the conduit to be led through by removing not only the centralized blocks, but also by folding out a respective number of layers, then insert the conduit fold the conduit duct around the conduit, respectively, insert it into the soffit of a wall opening, for instance a core drilling in a concrete wall, and tighten it there by the tensioning screws 14.

Figure 1B:
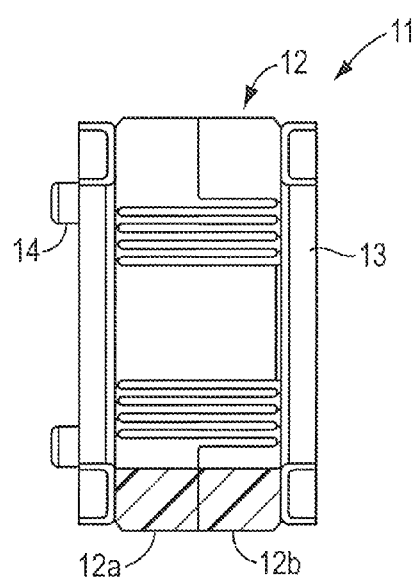
FIG. 1B is a diagrammatic, cross-sectional view taken along line 1B-1B of FIG. 1A.
Figure 1C:
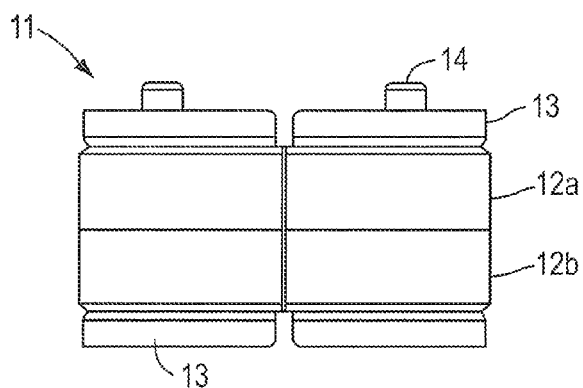
FIG. 1C is a top view of the conduit duct, with the conduit direction arranged vertically.

FIGS. 2A-2C shows a second embodiment 21 in analogous representations as in FIGS. 1A-1C. Corresponding parts are here provided with a reference numeral raised by 10.

In contrast to the first embodiment, the receival of up to three conduits is intended herein, as can be derived easily from the front view of FIG. 2A.

The sequences of layers provided in triple each correspond qualitatively to the first embodiment of FIG. 1, wherein three sequences of layers, each being cylindrically symmetrical seen individually, are arranged linearly displaced side by side. Nevertheless, the whole elastomer body 22 is only constructed of two elastomer body parts 22a, b, wherein a slit 25 analogous to the first embodiment penetrates through all three sequences of layers and leaves a hatched connecting web arranged in the upper part of the figure.

In this case, the squeezing plates 23 are, in a more general sense, also provided as U-profiles, though not in a simple semi-circular ring geometry, but each as a half of the rectangle corresponding to the overall geometry of the elastomer body 22 (in front view), except the circular sections for the sequences of layers. Due to the rectangular geometry, this embodiment is particularly suited for wall openings provided with a frame and less for bores.

Analogous explanations apply for the manufacturing and the use, wherein in this case also an assignment of a conduit to only one or only two sequences of layers is possible and, furthermore, also conduits of a different size can be inserted, because the sequences of layers can be adapted individually.

Figure 3A:
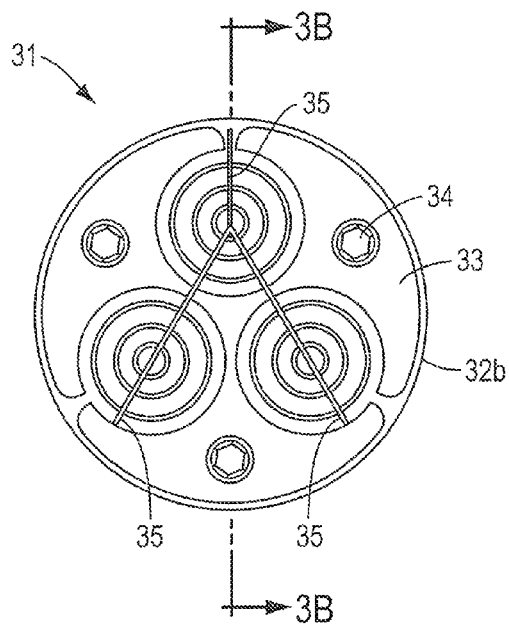
FIG. 3A is a front view of a further embodiment of the present invention.
Figure 3B:
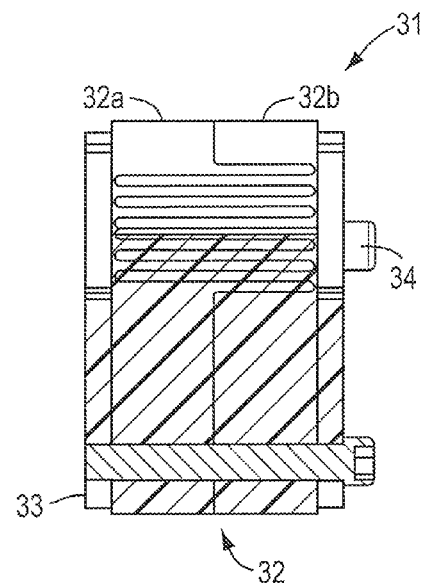
FIG. 3B is a diagrammatic, cross-sectional view taken along line 3B-3B of FIG. 3A.
Figure 3C:
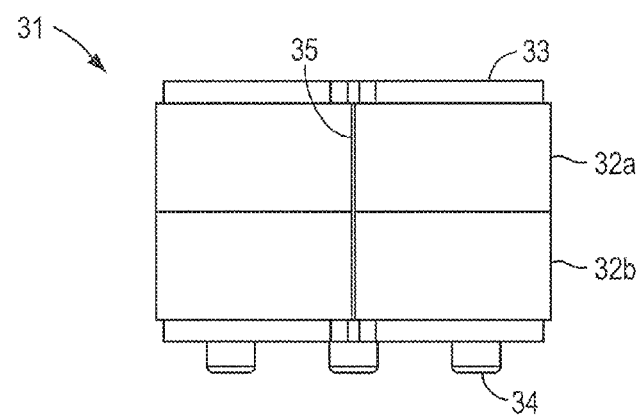
FIG. 3C is a top view thereof.

The third embodiment 31 in FIGS. 3A-3C resembles that of FIGS. 2A-2C in so far, as it is also an extension of the basic embodiment of FIGS. 1A-1C to three conduits. However, the arrangement of the three sequences of layers is not linear in this case, but has the form of an equilateral triangle, which is better adapted to circular wall openings and, in contrast to the second embodiment, not to rectangular ones. Therewith, this embodiment is superiorly suited for core bores (like the first embodiment).

Corresponding parts are again provided with reference numerals raised by 10 with respect to FIGS. 2A-2C. Accordingly, six squeezing plates 33 being U-profile-like in a generalized sense occur again. Since the sequences of layers are not arranged linearly, the slit 35 is Y-shaped in this case (turned around in FIG. 3A). The squeezing plates 33 are parted in such a way that they do not hinder folding open the upper sequence of layers in FIGS. 3A-3C (which is shown in section in FIG. 3B) in two parts from its centre.

Apart from that, the same explanations apply as for the previous embodiments.

Figure 4A:
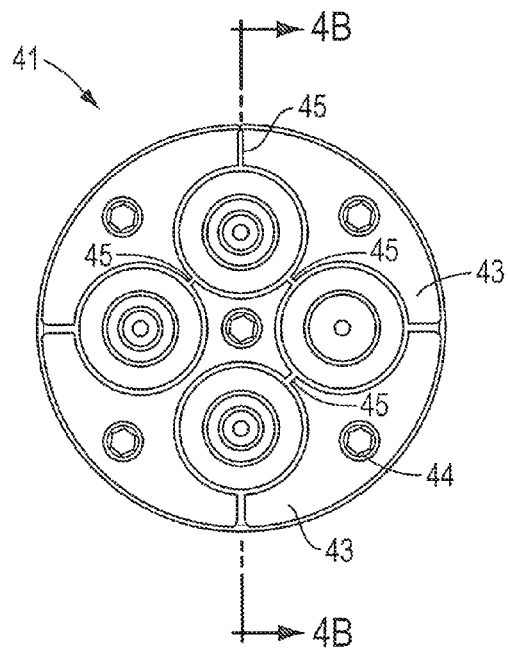
FIG. 4A is a front view of a further embodiment of the present invention.
Figure 4B:
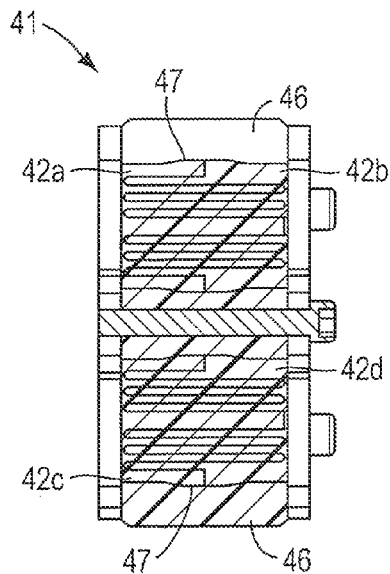
FIG. 4B is a diagrammatic, cross-sectional view taken along line 4B-4B of FIG. 4A.
Figure 4C:
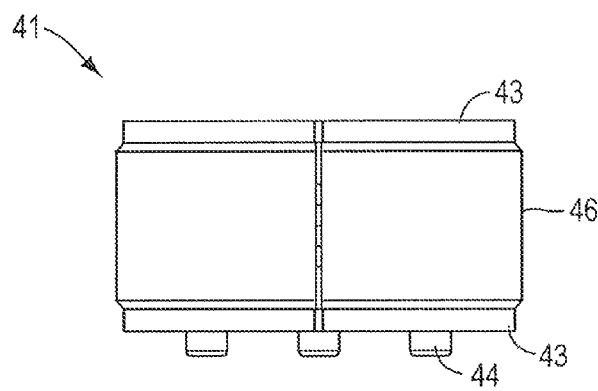
FIG. 4C is a top view thereof.

FIGS. 4A-4C shows a fourth embodiment 41 with reference numerals raised again by ten, which is at first hand an extension of the third embodiment to up to four conduits. Accordingly, four sequences of layers are again arranged quadratically in a circular-cylindrical basic geometry. In this respect, the remarks to the previous embodiments apply.

However, in contrast thereto, not only two elastomer body parts are provided. Rather, each sequence of layers consists of two elastomer body parts, of which the ones shown in FIG. 46 are referenced with 42a-d. Thus, eight elastomer body parts of the sequences of layers are therefor involved in total. Those are held in and surrounded by an elastomer frame 46, which is not referred to as elastomer body or elastomer body part for the sake of clarity, but actually consists of the same elastomer material. Namely, it comprises no sequences of layers by itself and provides the form-fitting adaption between those and the outer contour of the conduit duct. However, it is slit at positions labeled with 45 in the front view in FIG. 4A and thus is integral in total, but can be folded open in such a way that all elastomer body parts 42a-d (and the ones not shown and not numbered, of course) can be taken out.

A further difference to the first three embodiments are the radial thickenings provided axially centralized at the outer circumferential surfaces of the elastomer body parts 42a-d, which are labeled with 47 in FIG. 4A. These thickenings engage into corresponding concave recesses in the outer elastomer frame 46 and, therewith, secure the elastomer body parts 42a, b against being pulled out axially. It is easily conceivable that the forces acting locally, perpendicularly to the conduit direction at corresponding thickenings, would be increased, if the concave recess would be omitted. This would apply for a combination with the elastomer frame (without recess in this case) as well as for an installation into a wall opening without a further elastomer frame, namely according to the previous embodiments. If the thickenings and the corresponding conical recesses are omitted, the elastomer body parts can be pushed out more easily together with the conduit in conduit direction, so that a slitting of the elastomer frame 46 could also be omitted.

Figures 5A, 5B:
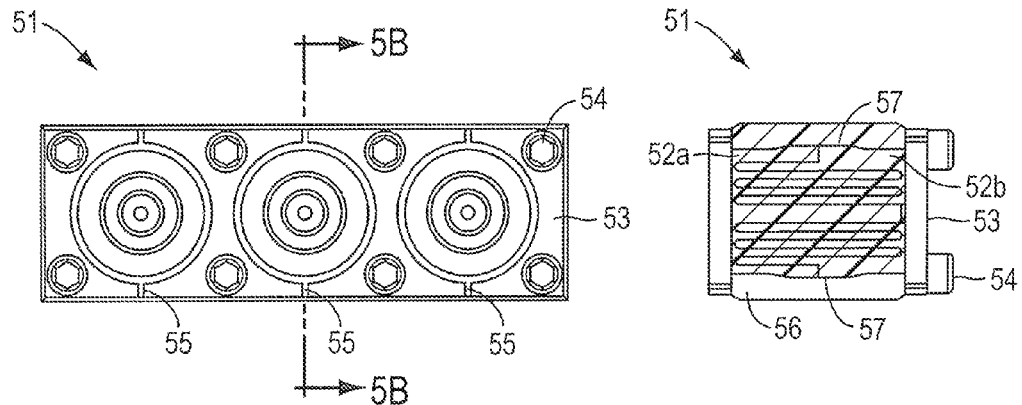
FIG. 5A is a front view of a further embodiment of the present invention.
FIG. 5B is a diagrammatic, cross-sectional view taken along line 5B-5B of FIG. 5A.
Figure 5C:
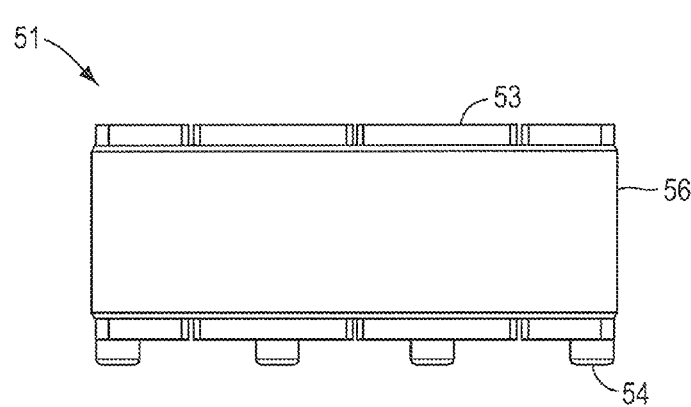
FIG. 5C is a top view thereof.

FIGS. 5A-5B show an embodiment, which corresponds to FIGS. 2A-2C in terms of the rectangular basic geometry, but to FIGS. 4A-4C in terms of the design of the elastomer parts. The comparison between FIGS. 4A-4C and FIGS. 5A-5C shows an important advantage of the separation between the elastomer body parts 42a-d, 52a, b in FIG. 5B, and the frame 46, 56 in FIG. 5, made there, namely that the former can be standardized. Indeed, the elastomer body parts 42a, c and 52a are at least identical to each other with respect to the injection mold, just like the elastomer body parts 42b, d and 52. Thus, they can be plugged together to units of sequences of layers, which can be combined to conduit ducts in different arrangements and numbers, for instance in a foursome, as in FIGS. 4A-4C, and in a threesome, as in FIGS. 5A-5C. An adaption to the corresponding outer dimensions of the conduit duct as well as an arrangement of the units of sequences of layers therein can then be made with the frames 46 and 56.

By the way, the outer frame is slit at the positions labeled with 55 in FIG. 5A, namely under the cylindrical units of sequences of layers in FIG. 5A, as considered by the hatching in FIG. 5B. Thereby, the elastomer frames can be folded open for reaching the sequences of layers 52b.

The latter can be slit as in FIGS. 3A-3C, wherein a cut from the outside up to the cylindrical axis is sufficient in this case. However, the slitting is not necessary, if it is accepted that the conduit has to be led through. Thus, no slit is drawn in FIGS. 5A-5C.

Figure 6A:
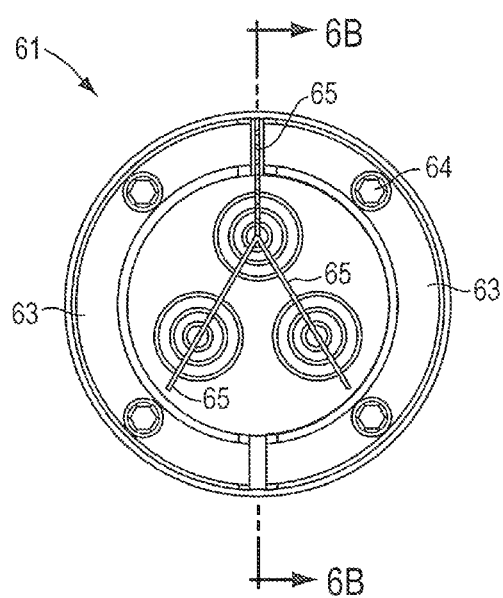
FIG. 6A is a front view of a further embodiment of the present invention.
Figure 6B:
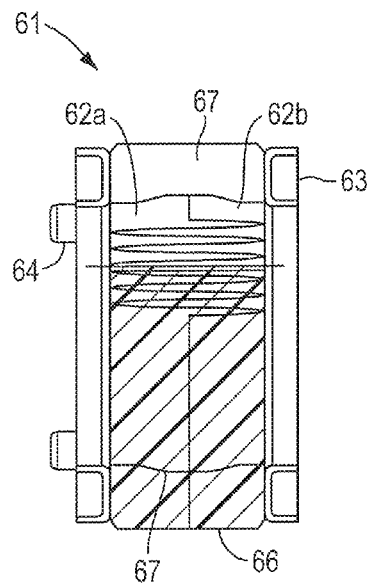
FIG. 6B is a diagrammatic, cross-sectional view taken along line 6B-6B of FIG. 6A.
Figure 6C:
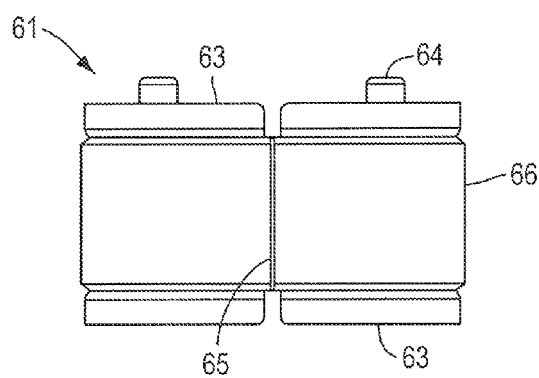
FIG. 6C is a top view thereof.

FIGS. 6A-6C show a sixth embodiment, which corresponds to FIGS. 3A-3C with respect to the basic geometry, but to FIGS. 4A-4C and FIGS. 5A-5C with respect to the parting/separation of the elastomer parts. Thus, reference is made to the corresponding explanations.

A further characteristic of the embodiment of FIGS. 6A-6C, which is in this way can also be implemented with the other embodiments, is that the layers are respectively conical, as shown by the sectioning in FIG. 6B. The half cone angle of the cone corresponding to the conical surface amounts approximately to 2° in this case.

Based on FIGS. 6A-6C, it is easily conceivable that, after removing a certain number of layers, an inner dimension is possibly obtained, which is still too little for the desired conduit, wherein removing a further layer shall however be avoided due to an inner dimension being too large then or a contact pressure being too little. In this case, the two elastomer body parts 62a, b can be slightly pulled apart from each other, wherefrom interspaces between the layers result, which add up during pressing to a smaller contact pressure onto the conduit due to the elastic deformation, or which allow leading through easily or inserting a corresponding conduit being previously too large.

The fact that the inner hollow space for the conduit also has a conical lateral surface in the non-deformed state is, due to the elasticity of the material, no drawback.

FIGS. 7A-7C show a further embodiment; the reference numerals are again raised by 10. This version can be explained starting from FIGS. 3A-3C. First, not only three sequences of layers being arranged in an equilateral triangle, but four sequences of layers arranged in a quadrate are, in contrast to FIGS. 3A-3C, provided in this case. Instead of the inverted Y-shaped slits 35 in FIGS. 3A-3C, two slits angled respectively exist in this case, each of which runs, in the front view of FIG. 7A, at an angle of 45' along the shortest distance from outside to the respective centre of the upper sequences of layers and bends downwards there. They just reach the undermost layer of the lower sequences of layers and end there. The squeezing plates 73 are correspondingly parted into three parts, which is evident from the figure. Therewith, this conduit duct can also be folded open for inserting conduits into all four sequences of layers.

Further, again, two elastomer body parts 72a, b exist, each being continuous over the total cross-sectional area of the conduit duct perpendicular to the conduit direction. A characteristic is that the two elastomer body parts 72a, b do not engage, but form interspaces between their respective layers for separate additional layers separated from each other, which are labeled with 72c here and have a hollow-cylindrical shape each. Three of them exist per sequence of layers, thus twelve in total.

The embodiment serves for illustrating the fact that the invention is not restricted to all layers belonging in a plurality to a common elastomer body part respectively, but that also single layers can occur. Particularly, it is absolutely possible to manufacture those hollow-cylindrical layers 72c also by injection molding. However, they are not particularly preferred due to the increasing number of individual parts.

FIGS. 8A-8C correspond basically to FIGS. 7A-7C. In contrast thereto, however, the individual layers 72c of FIGS. 7A-7C are implemented as a third interconnected elastomer body part 82c. Thereto, a central elastomer layer combining individual connecting webs is provided, which forms a circular disk perpendicular to the conduit and has a thickened rim outside. It is integral with the layers. Referring to the idea of combs used at the beginning, this means that, in the section of FIG. 8B, a comb with teeth directed to the right engages from the left and a comb with teeth directed to the left engages from the right into a comb provided centralized and having teeth directed to both sides.

On the one hand, this embodiment serves for an illustration of the generality of the idea of the invention. On the other hand, it can be particularly attractive, if a functional layer, basically filling up the cross-sectional area perpendicular to the conduit direction, shall be provided in the conduit duct, for instance as an EMI-protection, in the context of fire protection measures, or for special applications, for instance as an X-ray protection. In such cases, the elastomer material can be provided with additions, which act for its conductivity or its absorption capacity, the fire inhibition or other purposes. Often, such additions will slightly deteriorate the deformation and sealing properties. Then, it is convenient, if the corresponding elastomer body part, central in this case, is embraced on both sides by elastomer body parts having better elastical properties.

Exemplary additions are metallic or semiconducting particles as for instance aluminum, copper, silicon or also carbon, which are dispersed in an elastomer matrix and provide conductivity to it. Favorably, such a layer then is grounded, particularly via a screw of the conduit duct, which is provided anyway and acts as an EMI-protection then. Appropriate additions for fire protection are volume generating and blowing agents, which increase their volume significantly under the influence of heat, for example ammonium polyphosphate or melamine polyphosphate.

For an X-ray shielding, heavy metal oxides or compounds as lead oxide or lead sulfate, barium oxide or barium sulfate and the like can be applied.

The third elastomer body part 82c is thickened in a radially outer region and thus also has a larger length in conduit direction. This thickening can improve the handling properties, because it constitutes a comparably solid section of the third elastomer body part 82c. It can also be used in terms of specific materials, namely gel-like or swellable materials, which can safely seal heterogeneities at the wall opening by contacting the wall particularly good. Combining such materials with the elastomers pressed-on due to the pressing can be particularly advantageous with respect to the sealing properties. Of course, this applies totally independent of the above explanations concerning additional functions of the layer as EMI-protection, X-ray protection or fire protection layer.

The following FIGS. 9A-9B, 10A-10B, 11A-11B, and 12A-12B do not only show further embodiments of a conduit according to the invention, but also the usability of those conduit ducts as modules for a conduit duct system.

Figure 9A:
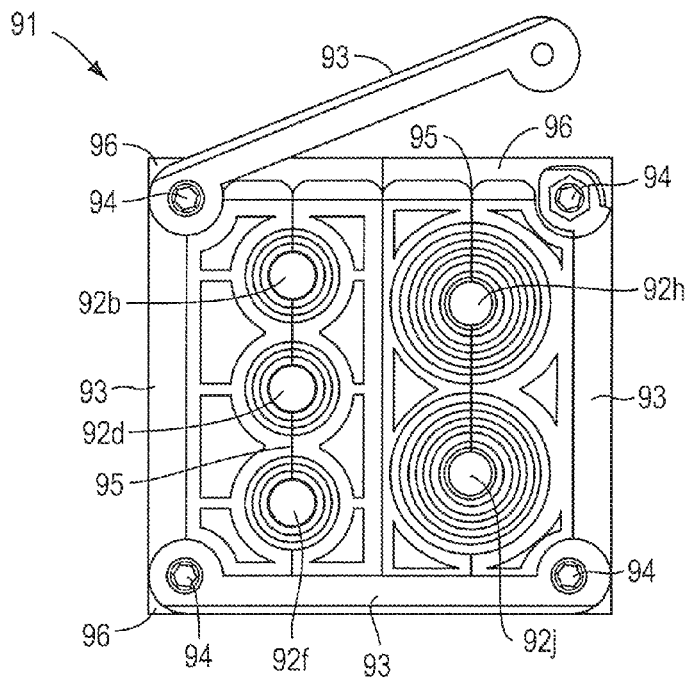
FIG. 9A is a front view of a module of conduit ducts in accordance with the present invention.

FIG. 9A shows in conduit direction of a quadratic module 91 of a conduit duct system 92 according to the invention for receiving five conduits, with an opened tensioning device 93, 93', 94. A side view in a direction perpendicular thereto is shown in FIG. 9B.

The elastomer body, in terms of the sequences of layers, is divided into ten elastomer body parts, of which the anterior 92b, d, f, h, j are shown and which can correspond to the FIGS. 4A-4C, 5A-5C, and 6A-6C. An elastomer frame 96, which encloses the elastomer body parts 92b-j, forms a sealing surface being arranged outside on the total circumference of the module 91 perpendicularly to the conduit direction, even if the tensioning device 93, 93', 94 is not tensioned, as with the previous embodiments. Furthermore it is, at the top in FIG. 9A, provided with a slit 95 for opening it perpendicularly to the conduit direction. The elastomer body parts 92b-j are adapted for receiving five conduits in total and are described more in detail below by means of FIGS. 10A-10B, together with the elastomer frame 96.

Figure 9B:
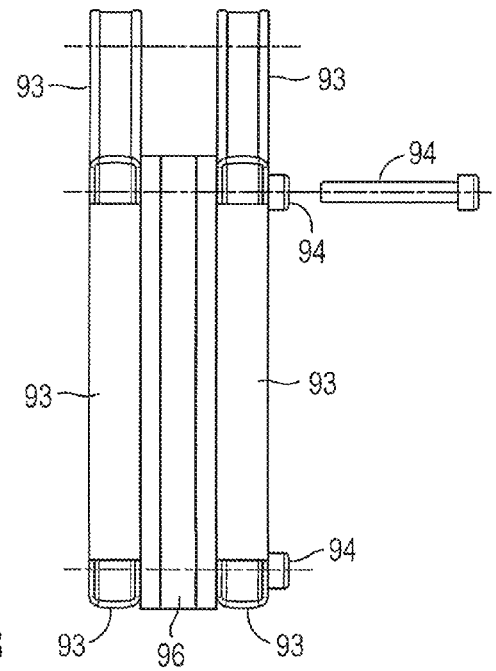
FIG. 9B is a side view thereof.

The tensioning device comprises on both sides in the conduit direction two U-profiles 93 per side, lying in FIGS. 9A-9C at the top and at the bottom and made of steel, and two vertical connecting pieces 93' per side, on the left and on the right side of the module 91, made of glass fiber reinforced plastic and having a device for receiving a screw 94 as a tensioning bolt at each of their ends. One of those screws 94 may act as a closure and a neighboring screw as an articulation for opening the module 91 and taking out the elastomer body parts 92b-j for receiving a conduit. In the picture, the screw 94 acting as a closure is pulled out of the tensioning device for opening it. The side view of FIG. 9B clarifies the setup of the modules 91 in conduit direction, with respect to which the tensioning device 93, 93', 94 lies outside on both sides. In between, the elastomer body parts 92b-j are enclosed in the frame 96.

Figure 10A:
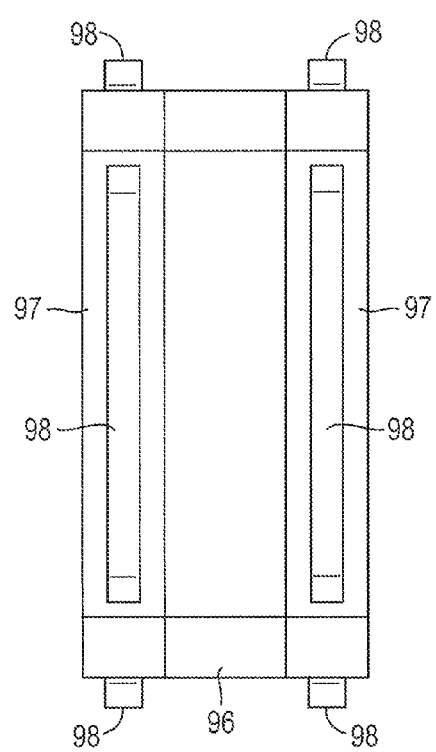
FIG. 10A is a top view of the module of FIGS. 9A and 9B, with squeezing plates mounted thereof.
Figure 10B:
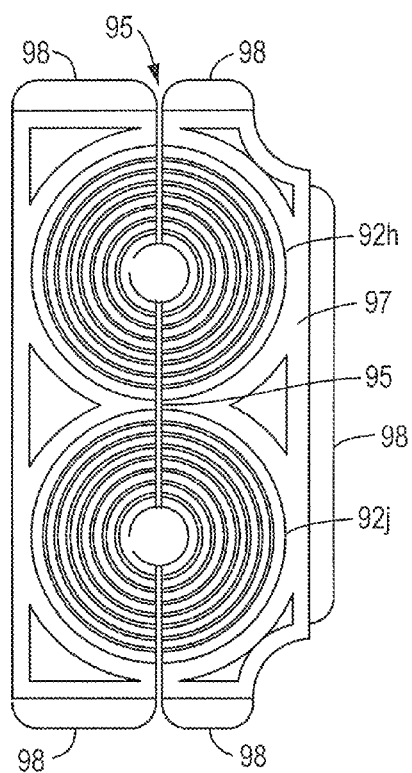
FIG. 10B is a side view thereof.

FIG. 10A shows in the right half a top view on the right half of the elastomer parts from FIGS. 9A-9B; in FIG. 10B a side view in a direction perpendicular thereto is displayed. The left half for receiving three conduits is built up analogously, so that the following description also applies to it and, basically, to further elastomer body parts with differing conduit configurations as well.

Basically, a setup with a cylindrical configuration of the elastomer body parts 92h, j (and of the complementary parts not shown) and a frame, 96 in this case, forming the interspace to the outer contour of the cross section (perpendicular to the conduit direction) of the conduit duct or the module 91 made of the same elastomer material is displayed. The frame 96 is furthermore parted into two halves, which comprise each corresponding cylindrical recesses and a rectangular outer contour with additional small quadrant-shaped recesses at the corners for the tensioning screws 94. Additionally, the halves can be multipart, if this is suitable due to manufacturing processes. The elastomer body parts 92h and j can, as already mentioned, be imagined as in the fourth and fifth or also the sixth embodiment, wherein a slit 95 runs through the upper elastomer body part 96h and through the upper half of the lower elastomer body part 96h, respectively besides the central filling pieces. This slit runs accordingly also through the upper region and the middle region of the elastomer frame 96.

On each face side in the conduit direction, two squeezing plates 97 made of glass fiber reinforce plastic are provided, which distribute the contact pressure of the tensioning device 93 to the elastomer parts. For each half shown, on each side in duct-direction two squeezing plates 97 parted along the slit 95 are attached, so that these can, despite the squeezing plates 97 attached to it, still be folded open. The squeezing plates 97 of the half for receiving two conduits are colored blue, those for receiving three conduits are colored red, so that here the color marking relates to the number but also to the maximum diameter of the conduits suited for insertion.

On their sides facing the tensioning device 93, 93', 94, the squeezing plates 97 have an outer profile 98, which engages behind parts of the tensioning device 93, 93', 94, when viewed in the conduit direction. This profile matching of the tensioning device and the squeezing plates 97 in the region of the outer profile 98 is shown in FIG. 9. It prevents a pulling-out of the squeezing plates 97 together with the elastomer parts held thereby out of the module 91 by form closure.

On their side facing the slit 95 the squeezing plates 97 respectively have semi-circular recesses having a radius, which is slightly larger than the largest diameter of the conduit to be received. This assures that the conduits fit through and the contact pressure is nevertheless distributed well.

Figure 11A:
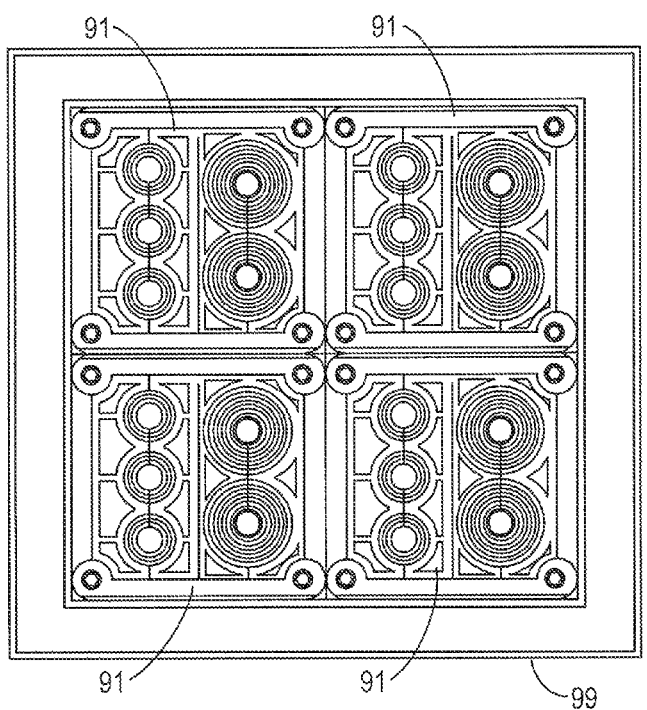
FIG. 11A is a top view of a conduit duct system according to the present invention with four modules in a frame.
Figure 11B:
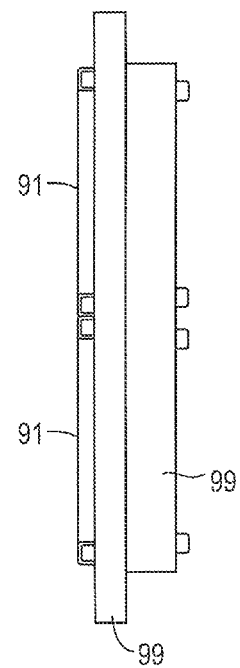
FIG. 11B is a side view thereof.

FIGS. 11A-11B show a top view and a side view of a mounted system according to the invention having four structurally identical modules 91 according to the invention in a frame 99 made of metal having exactly one continuous through-hole, which is designed to be welded on or to be, together with a sealing strip, screwed on in a wall opening.

In this embodiment, all modules 91 comprise an own tensioning device 93, 93', 94; however, one or two of the four modules 91 could also be inserted without an own tensioning device. Furthermore, the choice of four structurally identical modules 91 has been made freely here, and configurations with modules 91 for receiving different numbers of conduits as well as different conduit diameters are intended as well.

When all modules 91 are tensioned, each individual one is sealing on its four sides perpendicularly to the conduit direction by the elastomer body sealing surface 7 arranged outside in each case directly at the adjacent modules and at the frame 99. By releasing the tensioning device 93, 93', 94 of an individual module 91, the latter can be taken out of the conduit duct system without affecting the remaining modules 91 in their sealing function regarding possibly received conduits or their sealing and fastening with respect to the frame 99. This enables exchanging or subsequently adding a conduit in an existing conduit duct in an efficient way.

Figures 12A, 12B:
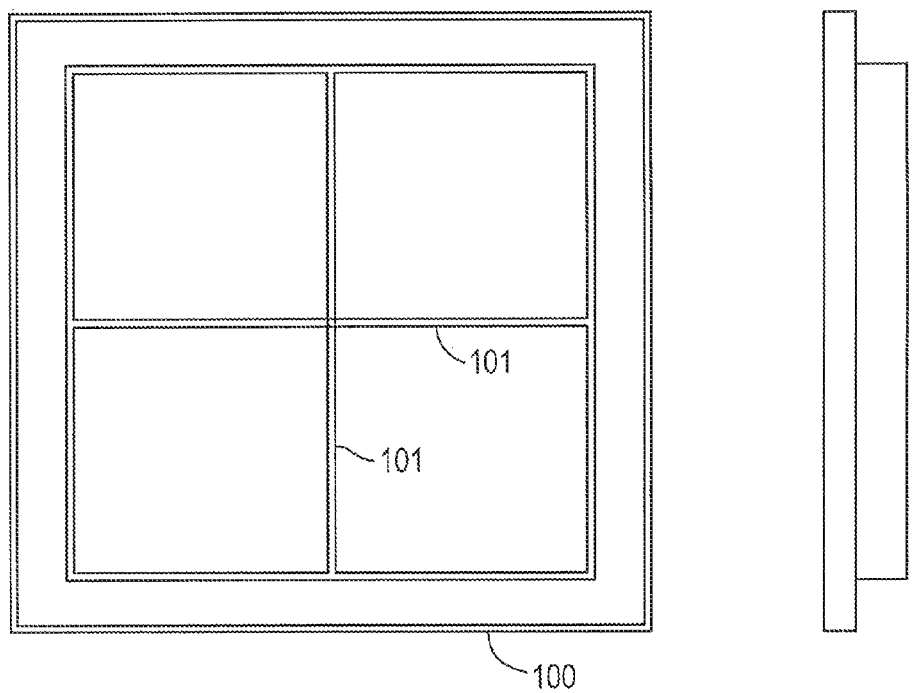
FIG. 12A is a top view of a frame with four holes there through for four modules respectively.
FIG. 12B is a side view thereof.

FIGS. 12A-12B show a top view and a side view of a frame 100 partitioned by bars 101 into four through-holes. According to this example, also partitionings of a wall opening by means of a frame into a different number of through-holes for receiving one conduit duct 91 (or also 21 or 51) or a conduit duct system each are preferred.

What is claimed is:

1. A conduit duct for sealing at least one conduit, comprising:
    an elastomer body for sealingly contacting said conduit, said elastomer body comprising at least two integral elastomer body parts, wherein each of said elastomer body parts includes a plurality of hollow sleeves,
    wherein in an assembled condition of said at least two elastomer body parts, the hollow sleeves of one of the elastomer body parts are arranged with the hollow sleeves of the other one of the elastomer body parts to form a sequence of layers surrounding said conduit; and
    a tensioning device positioned on said elastomer body in said assembled condition for compressing said elastomer body and thereby sealingly press said elastomer body onto said conduit.

2. The conduit duct according to claim 1, which comprises two of said elastomer body parts per conduit with the hollow sleeves of one of the elastomer body parts arranged in an alternating sequence with the hollow sleeves of the other elastomer body part.

3. The conduit duct according to claim 1, wherein an elastomer body part contains a functional addition, namely dispersed solid particles for an EMI-shielding by conductivity, for an X-ray absorption or for improving fire protection properties.

4. The conduit duct according to claim 1, wherein said plurality of hollow sleeves of each of said at least two elastomer body parts are symmetric to a central axis of said conduit and are connected to each other at an end wall of the respective one of said elastomer body parts that is perpendicular to said central axis.

5. The conduit duct according to claim 1, wherein inner and outer lateral surfaces of said layers are at least partially conical, wherein the half of the cone angle is 10° at maximum.

6. The conduit duct according to claim 1, wherein interfaces, being perpendicular to a central axis of said conduit, between adjacent elastomer body parts are arranged peripherically inside said sequence of layers, in the outer 10% of the total elastomer body length in a conduit direction, and are arranged outside, with respect to said sequence of layers, between 20% and 80% of said total length of said elastomer body in said conduit direction.

7. The conduit duct according to claim 1, wherein said elastomer body comprises a thickening of the cross section perpendicular to the conduit direction, arranged between 20% and 80% of the total length of said elastomer body.

8. The conduit duct according to claim 1, wherein said elastomer body parts are injection-molded parts, pressed parts or transfer-pressed parts.

9. A conduit duct set having a plurality of conduit ducts according to claim 1, which are different from each other, and comprise a respective elastomer body, which is identical to a respective elastomer body of other ones of said conduit ducts of said set respectively.

10. A conduit duct system having a plurality of conduit ducts according to one of claim 1, for sealing of said plurality of conduit ducts as modules,
wherein said plurality of conduit ducts each comprises:
a cross sectional area perpendicular to a conduit direction so that said plurality of conduit ducts can be inserted together for sealing,
each said module including a respective tensioning device, for tensioning individually, which acts in said conduit direction and thus can effect a widening of said elastomer body perpendicularly to said conduit direction, and
a respective sealing surface of each respective elastomer part, arranged, when said tensioning device is tensioned with respect to a direction perpendicular to said conduit direction, on the outside circumference of said conduit duct.

11. The conduit duct according to claim 1, wherein
said at least two elastomer body parts form interspaces between their respective layers, said elastomer body including one or more additional layers each having a hollow shape positioned in said interspaces.

12. The conduit duct according to claim 11, wherein
said additional layers are interconnected to form a third elastomer body part.

* * * * *